United States Patent
Varghese et al.

(10) Patent No.: US 12,361,278 B2
(45) Date of Patent: Jul. 15, 2025

(54) AUTOMATED GENERATION AND INTEGRATION OF AN OPTIMIZED REGULAR EXPRESSION

(71) Applicant: ACCENTURE GLOBAL SOLUTIONS LIMITED, Dublin (IE)

(72) Inventors: Vinu Varghese, Bangalore (IN); Nirav Jagdish Sampat, Mumbai (IN); Balaji Janarthanam, Chennai (IN); Anil Kumar, Bangalore (IN); Shikhar Srivastava, Bangalore (IN); Kunal Jaiwant Kharsadia, Pune (IN); Saran Prasad, Nagar (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1024 days.

(21) Appl. No.: 17/214,294

(22) Filed: Mar. 26, 2021

(65) Prior Publication Data
US 2022/0309335 A1    Sep. 29, 2022

(51) Int. Cl.
*G06N 3/08*    (2023.01)

(52) U.S. Cl.
CPC ..................... *G06N 3/08* (2013.01)

(58) Field of Classification Search
CPC ........ G06N 3/082; G06N 3/084; G06F 7/523; G06F 9/5027; G06F 17/16
See application file for complete search history.

(56) References Cited

U.S. PATENT DOCUMENTS

| | | | |
|---|---|---|---|
| 7,779,049 B1* | 8/2010 | Phillips | G06F 16/3322 707/809 |
| 9,898,467 B1* | 2/2018 | Pitzel | G06F 16/215 |
| 2010/0192225 A1* | 7/2010 | Ma | H04L 63/1416 709/224 |
| 2012/0192163 A1 | 7/2012 | Glendenning | |

(Continued)

OTHER PUBLICATIONS

NPL: Zhong, Z., Guo, J., Yang, W., Peng, J., Xie, T., Lou, J. G., . . . & Zhang, D. (Oct. 2018). Semregex: A semantics-based approach for generating regular expressions from natural language specifications. (Year: 2018).*

(Continued)

*Primary Examiner* — Li B. Zhen
*Assistant Examiner* — Sadik A Alshahari
(74) *Attorney, Agent, or Firm* — Mannava & Kang, P.C.

(57) ABSTRACT

A system for obtaining optimized regular expression may convert a received input data into a plurality of embeddings. The system may receive a generated regular expression corresponding to the plurality of embeddings, wherein the generated regular expression is at least one of an existing regular expression from a database and a newly generated regular expression. The system may parse the generated regular expression into a plurality of sub-blocks. The system may classify the plurality of sub-blocks to obtain a plurality of classified sub-blocks. The system may evaluate a quantifier class for each classified sub-block to identify a corresponding computationally expensive class. The system may perform an iterative analysis to obtain a plurality of optimized sub-blocks associated with a minimum computation (Continued)

time. The system may combine the plurality of optimized sub-blocks to obtain the optimized regular expression.

19 Claims, 12 Drawing Sheets

(56) References Cited

U.S. PATENT DOCUMENTS

| | | | | |
|---|---|---|---|---|
| 2014/0310291 | A1* | 10/2014 | Huang | G06N 5/025 707/755 |
| 2019/0384783 | A1* | 12/2019 | Malak | G06F 16/35 |
| 2021/0365802 | A1* | 11/2021 | Sofer | G06F 16/2453 |

OTHER PUBLICATIONS

NPL: Zhong, Zexuan, et al. "Generating regular expressions from natural language specifications: Are we there yet?" (2018). (Year: 2018).*

NPL: Backurs, Arturs, et al. "Which Regular Expression Patterns are Hard to Match?" (2016). (Year: 2016).*

NPL: Park, J. U., Ko, S. K., Cognetta, M., & Han, Y. S. (Nov. 2019). Softregex: Generating regex from natural language descriptions using softened regex equivalence. (Year: 2019).*

Tu Chaofan et al., "Learning Regular Expression for Interpretable Medical Text Classification Using a Pool-based Simulated Annealing and Word-vector Models", 2020 IEEE Congress on Evolutionary Computation (CEC), IEEE Jul. 19, 2020, pp. 1-7.

Matthew E. Peters et al., "Deep contextualized word representations", Mar. 22, 2018, 15 pages. <https://arxiv.org/pdf/1802.05365.pdf>.

Josh Taylor, "ELMo: Contextual language embedding", towards data science, Jan. 6, 2019, 10 pages. <https://towardsdatascience.com/elmo-contextual-language-embedding-335de2268604>.

Ashish Vaswani, "Attention Is All You Need", 31st Conference on Neural Information Processing Systems (NIPS 2017), Dec. 6, 2017, 15 pages. <https://arxiv.org/pdf/1706.03762.pdf>.

Jay Alammar, "The Illustrated Transformer", retrieved from the Internet on Feb. 23, 2021, 23 pages. <http://jalammar.github.io/illustrated-transformer/>.

European Search Report Application No. 22151574.5 dated Jun. 15, 2022, 6 Pages.

First Examination Report Indian Application No. 202214006730 dated Nov. 2, 2022, 8 Pages.

* cited by examiner

| REQ_ID | TEST CASE ID | NO. OF DOCS | DOC TYPE | FILE SIZE | TEST DESCRIPTION | TECHNOLOGY | LIBRARY | NO. OF MATCHES | TIME TAKEN (SECS) | AVG TIME TAKEN (SECS) |
|---|---|---|---|---|---|---|---|---|---|---|
| REQ11001 | REQ11001_TC_01 | 1 | PDF | 5 MB | TEST WITH 5MB PDF | PYTHON | RE | 300000 | 120 | 169.28 |
| REQ11001 | REQ11001_TC_02 | 1 | XLSX | 5 MB | TEST WITH 5MB XLSX | PYTHON | RE | 200000 | 50 | |
| REQ11001 | REQ11001_TC_03 | 1 | DOCX | 5 MB | TEST WITH 5MB .DOCX | PYTHON | RE | 100000 | 115 | |
| REQ11001 | REQ11001_TC_04 | 2 | PDF, XLSX | 5 MB, 5MB | TEST WITH 5MB PDF AND XLSX | PYTHON | RE | 500000 | 180 | |
| REQ11001 | REQ11001_TC_05 | 2 | PDF, DOCX | 5 MB, 5MB | TEST WITH 5MB PDF AND DOCX | PYTHON | RE | 400000 | 250 | |
| REQ11001 | REQ11001_TC_06 | 2 | XLSX, DOCX | 5 MB, 5MB | TEST WITH 5MB DOCX AND XLSX | PYTHON | RE | 300000 | 170 | |
| REQ11001 | REQ11001_TC_07 | 3 | PDF, DOCX, XLSX | 5 MB, 5MB, 5MB | TEST WITH 5MB PDF, DOCX AND XLSX | PYTHON | RE | 600000 | 300 | |
| REQ11001 | REQ11001_TC_01 | 1 | PDF | 5 MB | TEST WITH 5MB PDF | PYTHON | REGEX | 300000 | 90 | 152.8 |
| REQ11001 | REQ11001_TC_02 | 1 | XLSX | 5 MB | TEST WITH 5MB XLSX | PYTHON | REGEX | 200000 | 60 | |
| REQ11001 | REQ11001_TC_03 | 1 | DOCX | 5 MB | TEST WITH 5MB .DOCX | PYTHON | REGEX | 100000 | 100 | |
| REQ11001 | REQ11001_TC_04 | 2 | PDF, XLSX | 5 MB, 5MB | TEST WITH 5MB PDF AND XLSX | PYTHON | REGEX | 500000 | 170 | |
| REQ11001 | REQ11001_TC_05 | 2 | PDF, DOCX | 5 MB, 5MB | TEST WITH 5MB PDF AND DOCX | PYTHON | REGEX | 400000 | 200 | |
| REQ11001 | REQ11001_TC_06 | 2 | XLSX, DOCX | 5 MB, 5MB | TEST WITH 5MB DOCX AND XLSX | PYTHON | REGEX | 300000 | 180 | |
| REQ11001 | REQ11001_TC_07 | 3 | PDF, DOCX, XLSX | 5 MB, 5MB, 5MB | TEST WITH 5MB PDF, DOCX AND XLSX | PYTHON | REGEX | 600000 | 270 | |
| REQ11001 | REQ11001_TC_01 | 1 | PDF | 5 MB | TEST WITH 5MB PDF | C#.NET | REGEX LIB | 300000 | 229 | 380.2 |
| REQ11001 | REQ11001_TC_02 | 1 | XLSX | 5 MB | TEST WITH 5MB XLSX | C#.NET | REGEX LIB | 200000 | 450 | |
| REQ11001 | REQ11001_TC_03 | 1 | DOCX | 5 MB | TEST WITH 5MB .DOCX | C#.NET | REGEX LIB | 100000 | 23 | |
| REQ11001 | REQ11001_TC_04 | 2 | PDF, XLSX | 5 MB, 5MB | TEST WITH 5MB PDF AND XLSX | C#.NET | REGEX LIB | 500000 | 690 | |
| REQ11001 | REQ11001_TC_05 | 2 | PDF, DOCX | 5 MB, 5MB | TEST WITH 5MB PDF AND DOCX | C#.NET | REGEX LIB | 400000 | 270 | |
| REQ11001 | REQ11001_TC_06 | 2 | XLSX, DOCX | 5 MB, 5MB | TEST WITH 5MB DOCX AND XLSX | C#.NET | REGEX LIB | 300000 | 485 | |
| REQ11001 | REQ11001_TC_07 | 3 | PDF, DOCX, XLSX | 5 MB, 5MB, 5MB | TEST WITH 5MB PDF, DOCX AND XLSX | C#.NET | REGEX LIB | 600000 | 515 | |

TEST CASE CREATION BASED ON FILE TYPES, SIZE, OPTIMIZATION TYPE, ETC 552

TEST CASE EXECUTION BASED ON KPI – PERFORMANCE & NO. OF MATCHES 554

FIG. 5B

| | TEST CASE CREATION BASED ON FILE TYPES, SIZE, OPTIMIZATION TYPE, ETC 652 | | | | | | | TEST CASE EXECUTION BASED ON KPI – PERFORMANCE & NO. OF MATCHES 654 | | |
|---|---|---|---|---|---|---|---|---|---|---|
| REQ_ID | TEST CASE ID | NO. OF DOCS | DOC TYPE | FILE SIZE | TEST DESCRIPTION | TECHNOLOGY | LIBRARY | NO. OF MATCHES | TIME TAKEN (SECS) | AVG TIME TAKEN (SECS) |
| REQ11001 | REQ11001_TC_01 | 1 | PDF | 5 MB | TEST WITH 5MB PDF | PYTHON | RE | 300000 | 120 | 169.28 |
| REQ11001 | REQ11001_TC_02 | 1 | XLSX | 5 MB | TEST WITH 5MB XLSX | PYTHON | RE | 200000 | 50 | |
| REQ11001 | REQ11001_TC_03 | 1 | DOCX | 5 MB | TEST WITH 5MB .DOCX | PYTHON | RE | 100000 | 115 | |
| REQ11001 | REQ11001_TC_04 | 2 | PDF, XLSX | 5 MB, 5MB | TEST WITH 5MB PDF AND XLSX | PYTHON | RE | 500000 | 180 | |
| REQ11001 | REQ11001_TC_05 | 2 | PDF, DOCX | 5 MB, 5MB | TEST WITH 5MB PDF AND DOCX | PYTHON | RE | 400000 | 250 | |
| REQ11001 | REQ11001_TC_06 | 2 | XLSX, DOCX | 5 MB, 5MB | TEST WITH 5MB DOCX AND XLSX | PYTHON | RE | 300000 | 170 | |
| REQ11001 | REQ11001_TC_07 | 3 | PDF, DOCX, XLSX | 5 MB, 5MB, 5MB | TEST WITH 5MB PDF, DOCX AND XLSX | PYTHON | RE | 600000 | 300 | |
| REQ11001 | REQ11001_TC_01 | 1 | PDF | 5 MB | TEST WITH 5MB PDF | PYTHON | REGEX | 300000 | 90 | 152.8 |
| REQ11001 | REQ11001_TC_02 | 1 | XLSX | 5 MB | TEST WITH 5MB XLSX | PYTHON | REGEX | 200000 | 60 | |
| REQ11001 | REQ11001_TC_03 | 1 | DOCX | 5 MB | TEST WITH 5MB .DOCX | PYTHON | REGEX | 100000 | 100 | |
| REQ11001 | REQ11001_TC_04 | 2 | PDF, XLSX | 5 MB, 5MB | TEST WITH 5MB PDF AND XLSX | PYTHON | REGEX | 500000 | 170 | |
| REQ11001 | REQ11001_TC_05 | 2 | PDF, DOCX | 5 MB, 5MB | TEST WITH 5MB PDF AND DOCX | PYTHON | REGEX | 400000 | 200 | |
| REQ11001 | REQ11001_TC_06 | 2 | XLSX, DOCX | 5 MB, 5MB | TEST WITH 5MB DOCX AND XLSX | PYTHON | REGEX | 300000 | 180 | |
| REQ11001 | REQ11001_TC_07 | 3 | PDF, DOCX, XLSX | 5 MB, 5MB, 5MB | TEST WITH 5MB PDF, DOCX AND XLSX | PYTHON | REGEX | 600000 | 270 | |
| REQ11001 | REQ11001_TC_01 | 1 | PDF | 5 MB | TEST WITH 5MB PDF | C#.NET | REGEX LIB | 300000 | 229 | 380.2 |
| REQ11001 | REQ11001_TC_02 | 1 | XLSX | 5 MB | TEST WITH 5MB XLSX | C#.NET | REGEX LIB | 200000 | 450 | |
| REQ11001 | REQ11001_TC_03 | 1 | DOCX | 5 MB | TEST WITH 5MB .DOCX | C#.NET | REGEX LIB | 100000 | 23 | |
| REQ11001 | REQ11001_TC_04 | 2 | PDF, XLSX | 5 MB, 5MB | TEST WITH 5MB PDF AND XLSX | C#.NET | REGEX LIB | 500000 | 690 | |
| REQ11001 | REQ11001_TC_05 | 2 | PDF, DOCX | 5 MB, 5MB | TEST WITH 5MB PDF AND DOCX | C#.NET | REGEX LIB | 400000 | 270 | |
| REQ11001 | REQ11001_TC_06 | 2 | XLSX, DOCX | 5 MB, 5MB | TEST WITH 5MB DOCX AND XLSX | C#.NET | REGEX LIB | 300000 | 485 | |
| REQ11001 | REQ11001_TC_07 | 3 | PDF, DOCX, XLSX | 5 MB, 5MB, 5MB | TEST WITH 5MB PDF, DOCX AND XLSX | C#.NET | REGEX LIB | 600000 | 515 | |

FIG. 6B

AUTOMATED GENERATION AND INTEGRATION OF AN OPTIMIZED REGULAR EXPRESSION

BACKGROUND

Businesses utilize tools for validation or verification of incoming information. One such example may include validation of an email by determining email attributes including, for example, email ID, sensitive keywords, and alphanumeric strings. Other examples may include tasks such as data validation, data scraping, analytics, development of search engines, and other such tasks. Several other such applications may require for example, finding patterns, fuzzy matching, selective replacement and other such tasks. Regular expressions (regex) can be a potential tool for such purposes or applications. A regular expression involves a string based search string to find a sequence of characters that define a search pattern. The sequence of characters may include characters with a special meaning or a literal meaning. These characters may be used to identify text from an input for evaluating corresponding attributes based on matching between the regular expression and the text to which it is applied.

However, the regular expressions cannot be used across diverse platforms or programming languages without an appropriate optimization. This may require considerable amount of time and professional skill of system developers. In addition, the optimized solution may lack flexibility of usage and may need to be redesigned each time for a specific application. These aspects may increase the required time and costs involved in performing the optimization. Moreover, post-optimization, the integration of the optimized regex may also require manual intervention. Further the optimized solution may not be reliable or may be slow in terms of response time.

SUMMARY

An embodiment of present disclosure includes a system for generation of an optimized regular expression including a processor and a decoder. The processor may include a regular expression (Regex) optimizer and a simulator. The decoder may receive an input data corresponding to a programming language. The decoder may convert the input data into a plurality of embeddings. Each embedding may correspond to a vector based representation of an attribute corresponding to the input data. The processor may be included with an artificial intelligence (AI) engine to generate the optimized regular expression (Regex) based on at least one of the type of the programming language and a corresponding library in a database. The Regex optimizer may receive a generated regular expression corresponding to the plurality of embeddings. The generated regular expression may be at least one of an existing regex from a knowledge database and a newly generated regular expression from a regex generator associated with the processor. The Regex optimizer may parse the generated regular expression into a plurality of sub-blocks. The Regex optimizer may classify the plurality of sub-blocks using a neural network based classifier associated with the AI engine to obtain a plurality of classified sub-blocks. The Regex optimizer may evaluate, using the neural network based classifier, a quantifier class for each classified sub-block to identify a corresponding computationally expensive class. The Regex optimizer may perform, using a reinforcement learning based deep neural network associated with the AI engine, an iterative analysis. The reinforcement learning based deep neural network may be embedded with reinforcement learning. The iterative analysis may be performed to obtain a plurality of optimized sub-blocks associated with a minimum computation time. The iterative analysis is performed by replacing the quantifier class with a substitute class and performing iterative computation cycles to evaluate the corresponding computation time with respect to the substitute class. The Regex optimizer may combine the plurality of optimized sub-blocks to obtain the optimized regular expression.

Another embodiment of the present disclosure may include a method for automated generation of an optimized regular expression including step of converting, by the processor, an input data into a plurality of embeddings. The input data may correspond to a programming language. The method may include receiving, by the processor, a generated regular expression corresponding to the plurality of embeddings. The method may include parsing, by the processor, the generated regular expression into a plurality of sub-blocks. The method may include classifying, by the processor, the plurality of sub-blocks to obtain a plurality of classified sub-blocks. The method may include evaluating, by the processor, a quantifier class for each classified sub-block to identify a corresponding computationally expensive class. The method may include performing, by the processor, an iterative analysis to obtain a plurality of optimized sub-blocks associated with a minimum computation time. The method may include combining, by the processor, the plurality of optimized sub-blocks to obtain the optimized regular expression. The method may further include performing simulation, by the processor, based on the optimized regular expression, to generate an output. The output may be in the form of filtered results comprising an endorsed result. The endorsed result may correspond to a least value of processing time. The method may further include integrating automatically, by the processor, the endorsed result within an application module pertaining to the programming language.

Yet another embodiment of the present disclosure may include a non-transitory computer readable medium comprising machine executable instructions that may be executable by a processor to receive an input data corresponding to a programming language. The processor may convert the input data into a plurality of embeddings. The processor may receive a generated regular expression corresponding to the plurality of embeddings. The processor may parse the generated regular expression into a plurality of sub-blocks. The processor may classify the plurality of sub-blocks to obtain a plurality of classified sub-blocks. The processor may evaluate a quantifier class for each classified sub-block to identify a corresponding computationally expensive class. The processor may perform an iterative analysis to obtain a plurality of optimized sub-blocks associated with a minimum computation time. The processor may combine the plurality of optimized sub-blocks to obtain the optimized regular expression. The processor may perform simulation, based on the optimized regular expression, to generate an output in the form of filtered results comprising an endorsed result corresponding to a least value of processing time.

BRIEF DESCRIPTION OF DRAWINGS

FIG. 5B illustrates blocks 552 and 554 of FIG. 5A, according to an example embodiment of the present disclosure.

FIG. 6B illustrates blocks 652 and 654 of FIG. 6B, according to an example embodiment of the present disclosure.

DETAILED DESCRIPTION

Figure 1A:
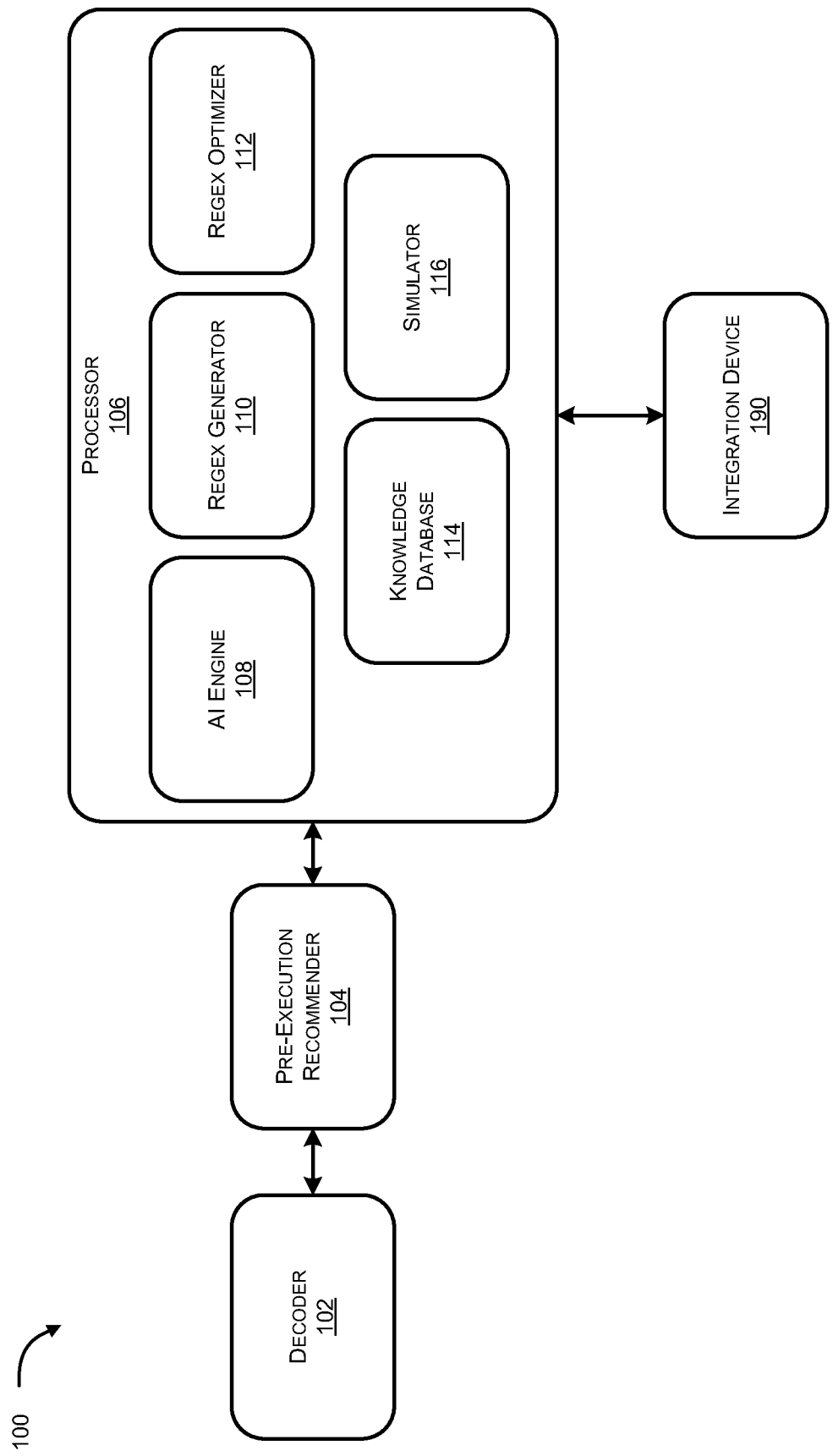
FIG. 1A illustrates a system for facilitating an optimized regular expression (regex), according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "a" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Overview

Various embodiments describe providing a solution for automated optimization of a regular expression by using artificial intelligence (AI) engine to obtain an optimized regular expression (hereinafter regular expression is referred to as regex or Regex). The automated optimization may be performed across various programming languages. The automated optimization may refer to multiple libraries corresponding to the programming language. The solution may include automated integration of the optimized regular expression into an application module. The solution may also include updating a database and the AI engine for future optimization.

An example embodiment of the present disclosure pertains to a system for automated optimization of a regex i.e. automated generation of the optimized regex. The proposed system may include a processor and a decoder. The processor may include a regular expression (Regex) optimizer, an AI engine, and a knowledge database. The processor may also include a regex generator and a simulator. The decoder may receive an input data corresponding to a programming language. The decoder may convert the input data into a plurality of embeddings. Based on the plurality of embeddings, a generated regex may be obtained. The generated Regex may be at least one of an existing Regex from a database and a newly generated Regex from a regex generator. The Regex optimizer may automatically optimize the generated Regex to obtain the optimized Regex.

For optimization, the Regex optimizer may parse the generated regular expression into a plurality of sub-blocks. The Regex optimizer may classify the plurality of sub-blocks to obtain a plurality of classified sub-blocks. The Regex optimizer may evaluate a quantifier class for each classified sub-block to identify a corresponding computationally expensive class. The Regex optimizer may perform an iterative analysis to obtain a plurality of optimized sub-blocks associated with a minimum computation time. The Regex optimizer may use a reinforcement learning based deep neural network associated with the AI engine for performing the iterative analysis. The reinforcement learning based deep neural network may be embedded with reinforcement learning. The iterative analysis may include replacing the quantifier class with a substitute class and performing iterative computation cycles. The iterative analysis may evaluate corresponding computation time with respect to the substitute class. Based on the identification of the most suitable substitute class, the regex optimizer may obtain the optimized sub-blocks. The optimized sub-blocks may be combined to obtain the optimized regex.

The simulator may perform simulation to generate an output in the form of filtered results. The output may be generated based on the optimized regular expression. The output may include an endorsed result corresponding to a least value of corresponding processing time. The system may facilitate automated integration of the endorsed result within an application module pertaining to a programming language.

In an example embodiment, the optimized Regex may be stored in the knowledge database. The AI engine may be updated based on the stored Regex so as to learn to automatically prioritize and select a suitable library for the iterative analysis. The updated AI engine may reduce the number iterative computation cycles.

Exemplary embodiments of the present disclosure have been described in the framework of automated optimization of a regular expression (Regex). In an example embodiment, the optimization of Regex may be used in application such as validation of an email by determining email attributes. The email attributes may include, for example, email ID, sensitive keywords, and alpha-numeric strings. However, one of ordinary skill in the art will appreciate that the present disclosure may not be limited to such application. The present disclosure may be useful for corporations in handling data validation, data scraping, analytics, development of search engines, and other such tasks. For example, optimization of the regular expression may be used to find patterns, fuzzy matching, selective replacement and other such tasks. Another example may include password matching. It will be appreciated that embodiments and concepts described herein may be applied in various other scenarios.

FIG. 1A illustrates a system for facilitating automated optimization of a regular expression (Regex), according to an example embodiment of the present disclosure. The system 100 may be implemented by way of a single device or a combination of multiple devices that are operatively connected or networked together. The system 100 may be implemented in hardware or a suitable combination of hardware and software. The system 100 includes a processor 106 and a decoder 102. The processor may include an AI engine 108, a regular expression (Regex) generator 110, Regex optimizer 112, a knowledge database 114 and a simulator 116. The system may also include a pre-execution recommender 104 and an integration device 190.

The decoder 102 converts a received input data into a plurality of embeddings. Based on the plurality of embeddings, the pre-execution recommender 104 may generate an automated recommendation. The automated recommendation may pertain to a requirement for the optimization. Prior to optimization, a generated regex is obtained, which may be an existing Regex or a newly generated Regex. The existing Regex may be pre-stored in the knowledge database 114. The newly generated Regex may be generated by the Regex generator 110. The generated regex may be automatically optimized by the regex optimizer 112. The optimization may be done by the regex optimizer 112 by using the AI engine 108 and based on an optimizer algorithm. Based on the optimized regex, the simulator 116 may perform simulation to generate an output in the form of filtered results including an endorsed result. The system may facilitate automated integration of the endorsed result within an application module by using the integration device 190.

The system 100 may be a hardware device including the processor 106 executing machine readable program instructions to perform automated optimization of regex based on the input data. The processor 106 may also store the optimized regex in the knowledge database 114. Execution of the machine readable program instructions by the processor may further enable the proposed system to update the AI engine based on the pre-stored Regex.

The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 106 may include, for example, microprocessors, microcomputers, microcontrollers, digital signal processors, central processing units, state machines, logic circuits, and/or any devices that manipulate data or signals based on operational instructions. Among other capabilities, processor 106 may fetch and execute computer-readable instructions in a memory operationally coupled with system 100 for performing tasks such as data tagging, data processing input/output processing, feature extraction, and/or any other functions. Any reference to a task in the present disclosure may refer to an operation being or that may be performed on data.

In an example embodiment, the pre-execution recommender 104 and the processor 108 may be associated with the knowledge database 114. The knowledge database 114 may be associated with a central or public repository. The repository may include large volume of multiple libraries corresponding to multiple programming languages. The stored libraries may be consumed by available intelligent units of the proposed system 100 for optimization and/or generation of regex. The repository may be updated regularly by adding optimized regex and libraries corresponding to the programming languages.

Figure 1B:
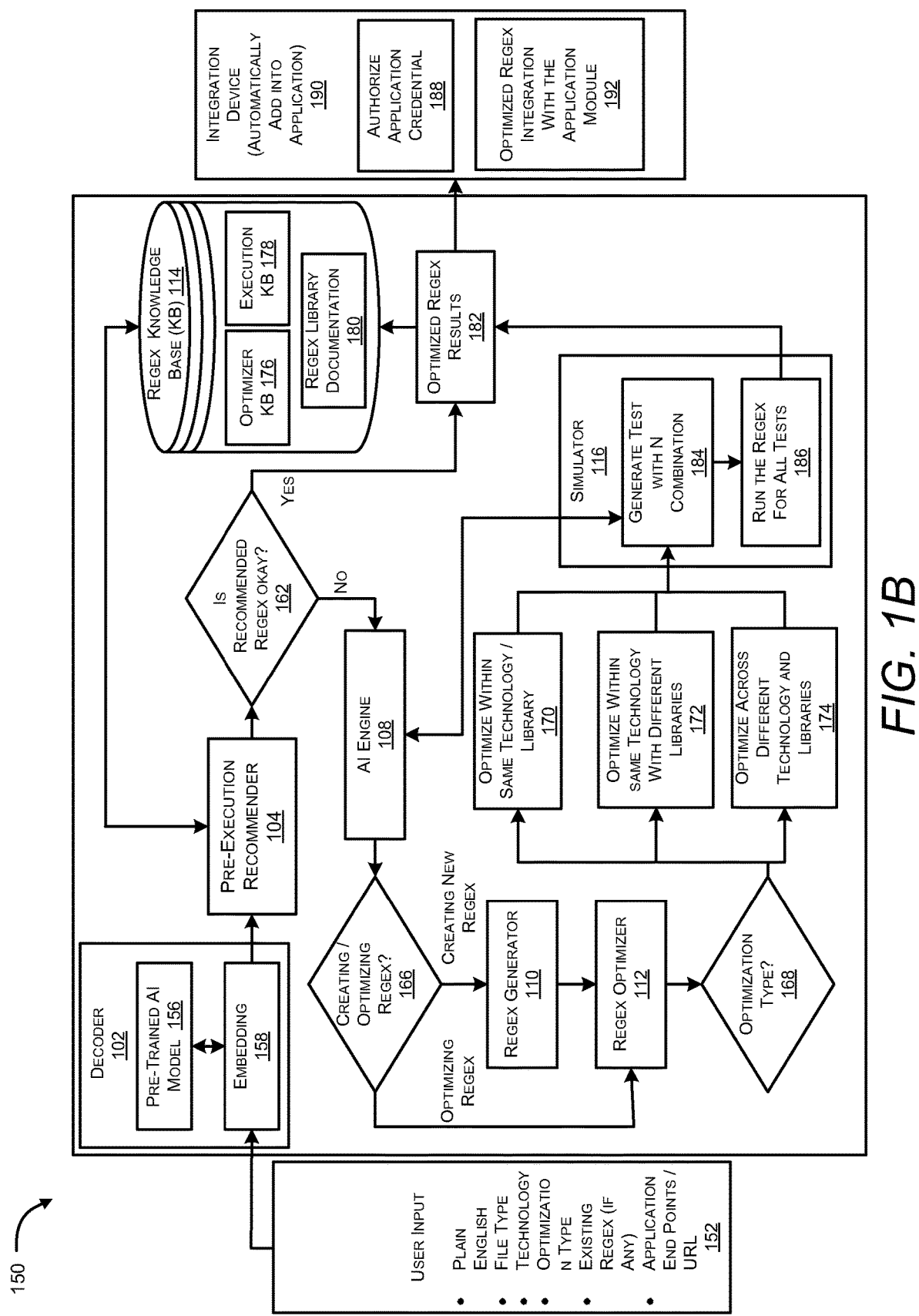
FIG. 1B illustrates a flow diagram depicting components of the system of FIG. 1, according to an example embodiment of the present disclosure.

FIG. 1B illustrates a flow diagram 150 depicting components of the system of FIG. 1, according to an example embodiment of the present disclosure. As illustrated in FIG. 1B, an input data 152 is received from a user. The input data 152 may correspond to at least one of a plain language text, a file type, a file size, a type of the programming language, an existing regular expression, and an application content. In an example embodiment, the plain language text may be English language. The plain language text may include an instruction in plain language. The instruction may indicate the nature of the task to be performed during optimization. For example, the plain language text may include the instruction "regex to find email ID in all documents". Various other sentences/instructions may also be used. The file type of the input data 152 may correspond to the type of file including, for example, "doc", "docx", "pdf", "xlsx" and other such file types, that may be included in the input data 152. The type of the programming language may correspond to a language such as, for example, "C#", ".NET", "Python" and other such programming languages. Information regarding the type programming language may be used by the system 100 to analyzed corresponding libraries for performing optimization of regex. The input data 152 may also include information pertaining to an already existing regex or an indication of existence of regex in the knowledge database 114. In an example embodiment, the application content of the input data may include a uniform resource locator.

As illustrated in FIG. 1B, the input data 152 is received by the decoder 102. The decoder 102 may include a pre-trained artificial intelligence (AI) model 156. The decoder 102 converts the input data into a plurality of embeddings using the pre-trained AI model 156. Each embedding may correspond to a vector based representation of an attribute corresponding to the input data. The vector based representation may include mapping the attributes to a vector of numerals. The attributes may include, for example, a word, a phrase, an image, an information pertaining to the input data, a link, and other such attributes. The embeddings may represent reduction in dimensionality of information for improving representation of the input data. In an example embodiment, the embeddings may be obtained using the AI model such as, for example, Embeddings from Language Models (ELMO). The ELMO facilitates computing word vectors on top of a two-layered bidirectional language model (biLM) to obtain the embeddings. Each layer of the biLM model may include two passes i.e. a forward pass and backward pass. In an example embodiment, the model may be non-customized model that may be pre-saved and used in any of a (.h5) saved file format or a pickle file format. The ELMO facilitates grouping attributes corresponding to the input data based on a semantic similarity to obtain the embeddings. The embeddings thus obtained, represent multiple sentences that may be grouped based on the semantic similarity. In an example embodiment, a combination of the models may be used for processing at least one of a text, an image, a video and an audio. In an example embodiment, the decoder may include a combination of models such as, for example, an embedding model, a language model, an object detection model, an image classification model and other such models. In an example embodiment, the decoder may include the embedding model that may be Bidirectional Encoder Representations from Transformers (BERT). BERT may provide dense vector representation for natural language by using a deep, pre-trained neural network with a transformer architecture. In another example embodiment, the decoder may include the language model that may be trained on a pre-processed dataset from a public repository. The language model may receive an input string text, output text embeddings for each layer, and negative log likelihood that may be used for calculating extend of disorder or perplexity. In an example embodiment, the object detection model may facilitate feature extraction. In an example embodiment, the object detection model may be a solid state drive (SSD) based object detection model trained on dataset such as Open Images V4 with ImageNet pre-trained MobileNet V2 as image feature extractor. The image classification model may be an image-based artwork attribute classifier trained on dataset. The image classification model may take input of one or more images, wherein the input may be in a specific form. For example, the input may be a 3-channel RGB color image of a certain size and scale. The image classification model may provide an output in the form of prediction that includes a probability vector of dimension corresponding to an artwork attribute. Various other models may be used to generate the embeddings.

The plurality of embeddings are received by the pre-execution recommender 104 coupled to the decoder 102 and the processor 106. The pre-execution recommender 104 may assist in understanding the need to perform optimization to obtain optimized regex. The pre-execution recommender 104 generates an automated recommendation based on the plurality of embeddings. The pre-execution recommender 104 may search for an existing optimized regex in the knowledge database 114, based on which the automated recommendation may be generated. The search may include verification of one or more parameters of the plurality of embeddings with corresponding pre-stored parameters in the knowledge database 114. At 162, the processor (AI engine) may analyze if the recommended regex is suitable. Based on the recommended regex, the AI engine provides at least one of a negative recommendation and a positive recommendation. Upon the positive recommendation (YES) at 162, the system may utilize an existing regex from the database 114. The positive recommendation may also be given in case no optimization is required and the existing regex is found to be suitable for direct use/integration. Upon a negative recommendation (NO) at 162, the processor may perform automated optimization to obtain the optimized regex expression. In another embodiment, a user may be able to provide a feedback for selection of a suitable regex recommended by the pre-execution recommender. In yet another embodiment, the user may be able to select the final regex such that the selected final regex may be directly integrated into an application without the optimization step.

To perform optimization, a generated regex may be required. The generated regex may be at least one of an existing regex from the database 114 and a newly generated regular expression from the regex generator 110. At 166, the AI engine 108 may verify the need for using the existing regex or generating the newly generated regex. In an example embodiment, the existing regex may be the recommended existing regex as recommended by the pre-execution recommender 104. In another example embodiment, the existing regex may be retrieved directly from the knowledge database 114. At 166, if the AI engine 108 concludes that the existing regex may be used, the existing regex is sent to the regex optimizer. At 166, if the AI engine 108 concludes that the regex needs to be newly generated, the regex generator 110 generates the newly generated regex.

Figure 2:
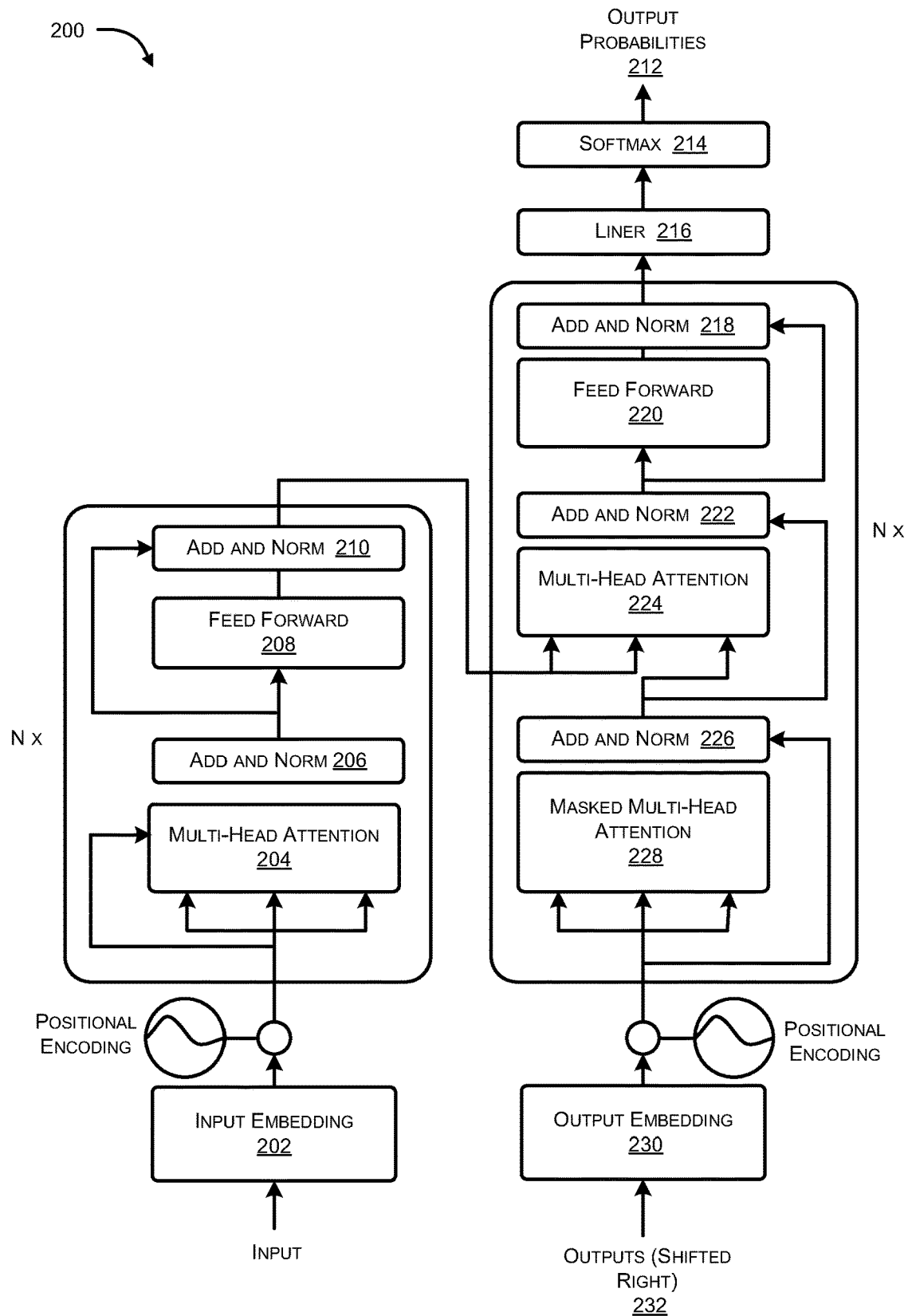
FIG. 2 illustrates a transformer architecture associated with the regex generator for automated generation of regex, according to an example embodiment of the present disclosure.

FIG. 2 illustrates a transformer architecture 200 for generating the newly generated regex, according to an example embodiment of the present disclosure. The input data 152 (in reference to FIG. 1B) is received as a corresponding input embedding 202 at the transformer architecture 200 of the regex generator 110. The transformer architecture 200 may be trained to generate regular expression in one or more programming languages, including for example, Python, C#, .Net, and other such languages. In an example embodiment, the transformer architecture 200 may be able to generate Regular expression from plain English text.

The transformer architecture 200 includes an encoder-decoder structure that use a neural sequence based model. The transformer architecture 200 includes stacked and self-attention based connected layers for an encoder and a decoder, as shown in the left half and right half, respectively in FIG. 2. The encoder includes a stack of multiple identical layers, wherein each layer includes at least two sub-layers i.e. first sub-layer (204, 206) and second sub-layer (208, 210). The first sub-layer (204, 206) includes a multi-head self-attention based configuration. The second sub-layer (208, 210) includes a position based fully connected feed-forward network. Each sub-layer includes a residual connection and a layer normalization.

Similarly, the decoder layer includes a stack of multiple identical layers, wherein each layer includes at least three sub-layers i.e. first sub-layer (228, 226), second sub-layer (224, 222) and third sub-layer (220, 218). The first sub-layer (228, 226) and the second sub-layer (224, 222) include a multi-head self-attention based configuration. The first sub layer (228, 226) includes a masked multi-head attention layer. The masked multi-head attention layer applies mask on the future position from a target so that the encoder may be only allowed to attend to encodings of earlier positions. The third sub-layer (220, 218) includes a position based fully connected feed-forward network. The decoder sublayers also include a residual connection and a layer normalization. The second sub-layer (224, 222) performs multi-head self-attention based on the output of the encoder layer. The transformer architecture 200 includes positional encodings added at bottom of the stacks corresponding to the encoder and the decoder. The positional encodings are added to provide information about a relative position or an absolute position of a token in an input sequence corresponding to the input.

In an example embodiment, during training phase, an output embedding (230, 232) may be obtained from a regex for the input embedding 202, for example, as regex \S+@. The system may enable conversion of a language (X) into a language (Y), wherein X may be a plain English text and Y may be a corresponding regex/translation of X. The output embeddings 232 may be shifted to right by one position with respect to the input/input embedding and a token start may be added, so that the model may avoid matching the encodings based on the sequence of appearance. In an example embodiment, the input embedding is evaluated at the first sublayer 204, 206 of the encoder. For example, in case of an input sentence, the first sub-layer 204, 206 may evaluate multiple words in the input sentence while encoding a specific word that is generated as a first output. The first output may be fed to a feed-forward neural network of the second sub-layer 208, 210 of the encoder to obtain a second output. The second output may be sent to the second sub-layer 224, 222 of the decoder so that the decoder can focus on relevant information provided by the encoder.

Thus, in reference to the sub-layers (204, 206), (228, 226), (224, 222), the multi-head self-attention mechanism may be described as a function that maps a query and a set of key-value pairs to an output. The query, the key, the value, and the output include vectors, wherein the output may be computed as a weighted sum of the values. The weight assigned to each value may be computed by a compatibility function of the query with the corresponding key. In the self-attention layers of the encoder, the key, the value and the query are taken from the output of a previous layer in the encoder. In the self-attention based connected layers of the decoder, a query or input from is taken from a previous decoder layer, wherein memory keys and values are provided from the output of the encoder. This enables the decoder to process at multiple parameters with respect a provided input.

The transformer architecture 200 may include linear transformation 216 and the softmax function 214 to convert a final output from the decoder for prediction of output probabilities 212. In an example embodiment, the output probabilities 212 may be related to a newly generated regex and may indicate the best possible regex available for a corresponding regex library. The transformer architecture may be pre-trained with multiple regex libraries. For example, a regex library (Z) may pertain to requirements of regex (X) and (Y). In that case, if regex X may have higher probability compared to regex Y for a requirement, then Regex X may be displayed as final output for Regex Library Z. A model corresponding to the transformer architecture (200) may be trained directly from corpus of documentation of various regex libraries spanning across multiple programming languages. The trained model may utilize the softmax function 214 to generate the generated regular expression in the programming language. In an example embodiment, a standard (unit) softmax function $\sigma: R^K \rightarrow R^K$, defined by the formula:

$$\sigma(z)_i = \frac{e^{z_i}}{\sum_{j=1}^{K} e^{z_j}} \text{ for } i = 1, \ldots, K \text{ and } z = (z_1, \ldots, z_K) \in \mathbb{R}^K$$

Figure 3:
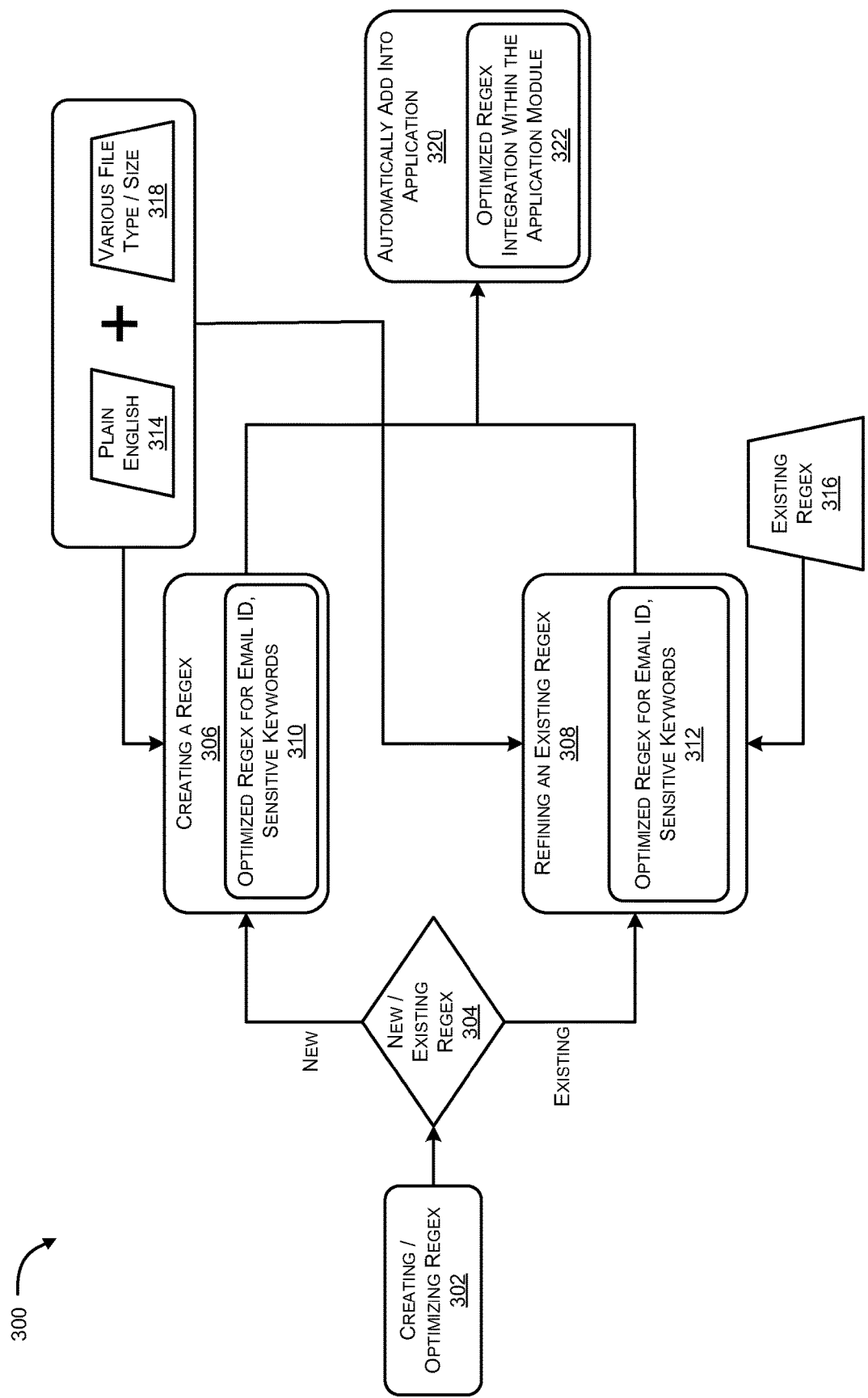
FIG. 3 illustrates an example overview of obtaining optimized regex, according to an example embodiment of the present disclosure.

FIG. 3 illustrates a flow diagram 300 depicting an example overview of obtaining optimized regex, according to an example embodiment of the present disclosure. The input may include embeddings of plain English text 314 and information pertaining to file type and/or file size 318. As shown in FIG. 3, for the optimization 302, the system may decide at 304 if a regex may be a newly generated or an existing regex may be used. Based on the received requirement, in an example embodiment, the newly generated regex may be generated at 306. The newly generated regex may be further optimized at 310 for application including, for example, email ID validation of email ID and case-sensitive passwords. In another example embodiment, the existing regex may be retrieved at 316. The existing regex may be refined (308) and/or optimized at 312 for application including, for example, email ID validation of email ID and case-sensitive passwords. Once the optimized regex Is obtained by any of the above described ways, the optimized regex is automatically added/integrated into an application module at 320 and 322.

Referring back to FIG. 2, the regex optimizer 112 may perform the automated optimization based on at least one of a same programming language or a different programming language. The regex optimizer 112 may refer to multiple libraries corresponding to the programming language pre-stored in the knowledge database 114. The regex optimizer 112 may perform the optimization based on the determination of an optimization type 168 to understand one of 3 possible scenarios. A first scenario may include an optimization 170 within same technology (or programming language) and/or library. A second scenario may include an optimization 172 within same technology (programming language) but with different libraries. A third scenario may include an optimization 174 within different technologies (programming languages) and different libraries. An information related to the optimization type may be derived from the input data 152 or may be evaluated by the regex optimizer 112 based on information provided in the input data 152.

For optimization, the Regex optimizer 112 parses the generated regular expression into a plurality of sub-blocks. In an example embodiment, the Regex optimizer parses by using a split function corresponding to the programming language. The plurality of sub-blocks are classified to obtain a plurality of classified sub-blocks. In an example embodiment, the Regex optimizer 112 replaces the quantifier class with the substitute class by using a replace function corresponding to the programming language. The Regex optimizer 112 may then evaluate a quantifier class for each classified sub-block to identify a corresponding computationally expensive class. In an example embodiment, both the steps of classification and evaluation may be performed by the Regex optimizer using a neural network based classifier associated with the AI engine 108. The Regex optimizer may then perform an iterative analysis to obtain a plurality of optimized sub-blocks associated with a minimum computation time. In an example embodiment, the Regex optimizer 112 may use a reinforcement learning based deep neural network associated with the AI engine 108 for performing the iterative analysis. The reinforcement learning based deep neural network may be embedded with reinforcement learning. The iterative analysis may include replacing the quantifier class with a substitute class and performing iterative computation cycles for the substitute class. In an example embodiment, the Regex optimizer 112 replaces the quantifier class with the substitute class by using a replace function corresponding to the programming language. The iterative analysis may evaluate corresponding computation time with respect to the substitute class. The corresponding computation time may be evaluated to verify if computation loops of the iterative computation cycles corresponding to the substitute class exceeds a pre-defined threshold. If the computation time for substitute class exceeds the pre-defined threshold, the computation loops are discarded and a new substitute class is evaluated to identify the substitute class that requires minimum time or has minimum computation loops. In an embodiment, the computation loops may be discarded based on penalization of the computation loops by a reinforcement logic associated with the AI engine. Once the appropriate substitute class is identified, the plurality of optimized sub-blocks are obtained that are combined to obtain the optimized regex.

An example optimization may be performed by an optimizer algorithm of the regex optimizer. The optimization may be performed in steps as provided in Table 1 below. The tabular data indicates an input and an output at each step. As illustrated in Table 1, generated regex i.e. \S+@\S+ is parsed into plurality of sub-blocks. The classification of sub-block is done to understand the attributes of the sub-blocks. The quantifier class is identified in the next step to evaluate the computationally expensive class. The term "computationally expensive class" is analogous to computationally complex class and refers to class with high computational complexity that requires higher processing time and resources.

AI engine 108 of FIG. 1, according to an example embodiment of the present disclosure. The reinforcement learning based deep neural network includes artificial neural network

TABLE 1

Example of regex optimization

| Tasks | Input | Output |
|---|---|---|
| Parsing generated regex into plurality of sub-blocks | \S+@\S+ | \S-Sub_block1<br>+-Sub_block2<br>@-Sub_block3<br>\S -Sub_block4<br>+-Sub_block5 |
| Classification of the sub-blocks | \S-Sub_block1<br>+-Sub_block2<br>@-Sub_block3<br>\S-Sub_block4<br>+-Sub_block5 | \S-Matches any non-whitespace character; equivalent to [^\s].<br>"+"-Matches 1 or more (greedy) repetitions of the preceding.<br>'@'-string match to identify the presence of @ |
| Identifying the respective quantifiers in the sub-blocks and computationally expensive classes based on the input data | \S-Sub_block1<br>+-Sub_block2<br>@-Sub_block3<br>\S-Sub_block4<br>+-Sub_block5 | Logic 1: Using Neural Network classification, identify the quantifier<br>Logic 2: Using Python, Computation time for quantifier in a sub block is computed<br>e.g. Based on logic 1 & logic 2, following is the sample output.<br>{Sub_block 2/'+'}-Greedy Quantifier 60 secs base on the sample input data |
| Optimize the computationally expensive classes (Replace by iterating with best fit quantifier (substitute class)) | {+}-Greedy Matching<br>{@}-String matching<br>{+}-Greedy Matching | {'?'}-Non Greedy Quantifier<br>{'@'}-String matching<br>{'?'}-Non Greedy Quantifier |
| Apply Reinforcement learning embedded within Reinforcement learning based deep neural network to discard the substitute class if computation time exceeds the threshold to identify and optimize the Regex with minimal computation time | {'+ ?'}-Non Greedy Quantifier<br>{'@'}-String matching<br>{'+ ?'}-Non Greedy Quantifier<br>Sample subset data from input file | Example:<br>1) Threshold is set at 3.5 mins based on historical insights<br>2) Optimization cycle-with substitute class, Regular Expression: \S + * @ \S + Overall time = 4 mins<br>3) Total time exceeds threshold, so substitute class discarded/penalized and second optimization cycle by replacing with another appropriate substitute class Regular Expression: \S + ? @ \S + overall time = 3.4 mins<br>4) Stop the optimization since it meets the threshold |
| Combine the optimized sub-blocks | \S-Sub_block1<br>+?-New_Sub_block2<br>@-New_Sub_block3<br>\S-Sub_block4<br>+?-New_Sub_block5 | \S +? @ \S +? |
| Generate final optimized regex | \S +?@\S+?' | |

As illustrated in Table 1, once identified, the computationally expensive class corresponding to the quantifier class is replaced with a substitute class and analyzed for time taken for computational loops. For example, Non Greedy Quantifier corresponding to { ' ?' } is identified to be a substitute class and analyzed for time taken computational loops. If the time taken exceeds the pre-defined threshold the class is rejected and another substitute class is evaluated. As illustrated in Table 1, once the appropriate substitute class is identified, the optimized sub-blocks are obtained. The optimized sub-blocks are combined to obtain the optimized regex as S+?@\S+?' as illustrated.

Figure 4:
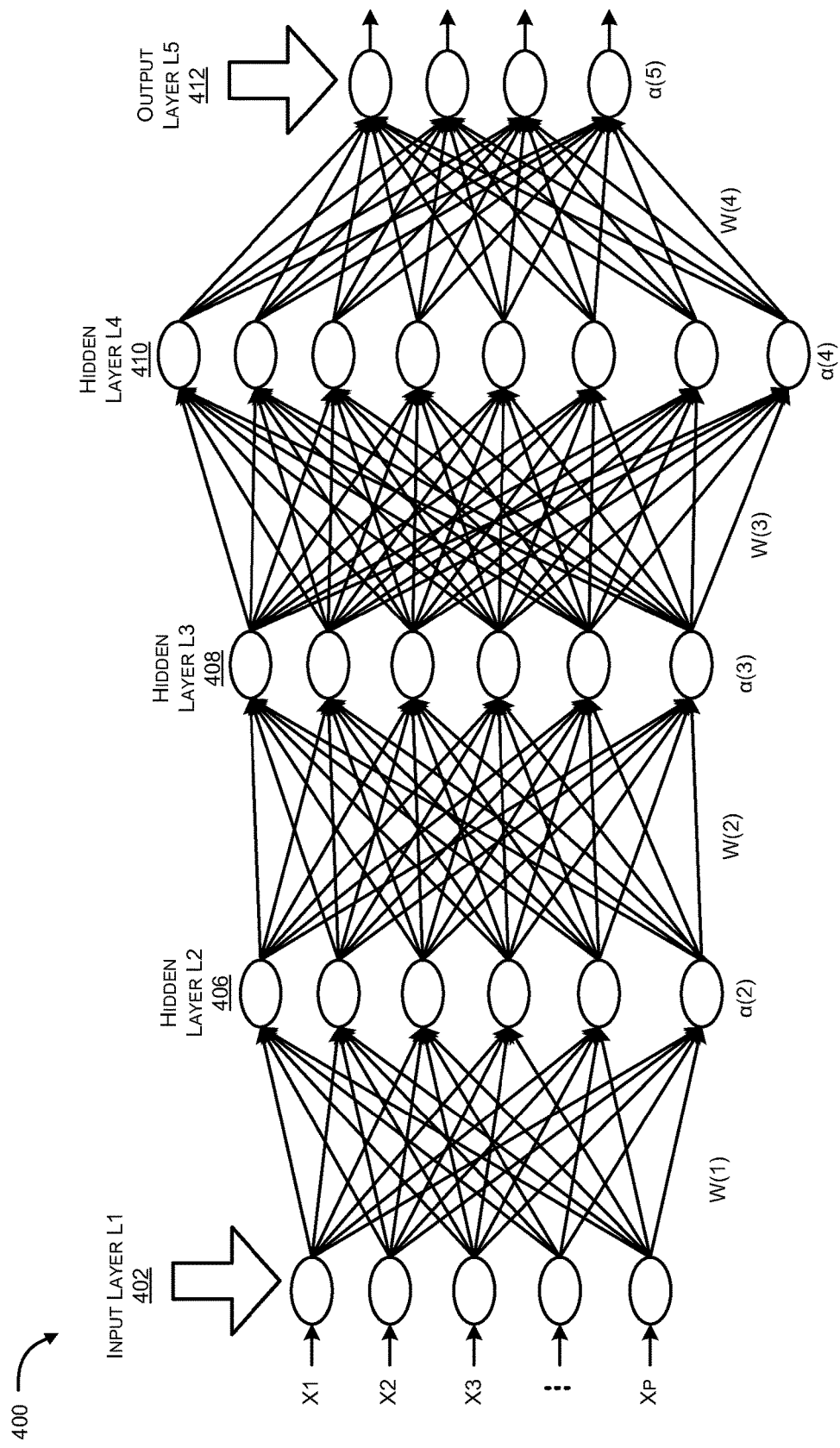
FIG. 4 illustrates a reinforcement learning based deep neural network associated with an artificial intelligence engine of FIG. 1, according to an example embodiment of the present disclosure.

In an example embodiment, the iterative analysis is performed using reinforcement learning embedded within a reinforcement learning based deep neural network. The reinforced learning comprises a learning model associated with the AI engine 108. FIG. 4 illustrates the reinforcement learning based deep neural network 400 associated with the including neurons, which are shown in the form of circles in FIG. 4. The reinforcement learning based deep neural network may include three basic layers such as an input layer L1 (402), multiple hidden layer (for example 3 layers, L2, L3, L4) (406, 408, 410) and an output layer L5 (412). The hidden layers (406, 408, 410) may be between the input layer 402 and the output layer 412. The neurons of the neural network may receive a set of inputs at the input layer 402. The set of inputs may include X1, X2, X3, . . . $X_P$. Each input (for example X1) is evaluated by each neuron of the first hidden layer L2 (406) to assign corresponding weightage through an activation function to generate an output at the hidden layer L2. The output from the hidden layer L2 is forwarded to next hidden layer L3 and the same process continues. Thus, output of one hidden layer becomes input for the next hidden layer. A final output may be generated at the output layer (L5) for each input provided at the input layer 402.

The reinforcement learning based deep neural network of AI engine 108 may include a training phase. The training phase may include a large volume of input data fed to the input layer of the neural network, and an estimated output may be analyzed for loss/error value. The efficiency of regex optimization or the ability to identify the appropriate class with minimum computation loops may depend on the training phase of the AI engine 108. The AI engine 108 may become more accurate with more volume of data fed to the input layer during the training stage. In an example embodiment, the input layer may be fed input information. In an example embodiment, the input information may include one or more existing regex dataset such as, for example, KB13. In another example embodiment, the input information may include regex documentation of multiple regex libraries across multiple technologies that may be fed to the AI model during the training phase. Input information may include at least one of an existing regular expression and a plain language text. Once trained, in the testing stage, the AI engine 108 may automatically perform regex optimization.

In an example embodiment, the AI engine 108 comprises a learning model associated with the AI engine 108 for reinforced learning. In an example embodiment, the reinforced learning may include an off-policy based reinforcement learning model. The reinforcement learning model may be a variant of Deep Deterministic Policy Gradient (DDPG). The DDPG may contain two reinforcement learning based deep neural networks that may include an actor-critic algorithm. The actor-critic algorithm may correspond to a policy function structure i.e. an actor structure, and a value function structure referred to as a critic structure. The two reinforcement learning based deep neural networks in DDPG may correspond to one reinforcement learning based deep neural network that may pertain to the actor and another reinforcement learning based deep neural network that may pertain to the critic. The actor may take action in an environment and the critic may penalize or reward the actor based on the accuracy of the action taken. An information pertaining to the optimized regular expression may be stored in the knowledge database 114. Based on the stored information, the learning model of the AI engine 108 may be automatically updated. Upon updating the AI engine 108, the Regex optimizer may learn to automatically prioritize and select a suitable library for each sub-block during the iterative computation cycles. The number of required iterative computation cycles may reduce by using the updated learning model. For example, a generated regex may be produced with 100 computation cycles, wherein the regex optimizer may need to optimize from 100 to 30 computation cycles. Over a period of time, a Regex generator may generate regex in 30 computation cycles in the first instance/iteration itself based on the insights from the optimizer algorithm of the regex optimizer.

Referring back to FIG. 1B, the optimized regex as obtained from the regex optimizer 112 is received by the simulator 116. The simulator 116 may perform simulation to generate an output based on the optimized regular expression. The output may be in the form of filtered results 182 comprising an endorsed result. The endorsed result may correspond to a least value of corresponding processing time. The simulation may include key performance indicators (KPI) of the optimized regular expression including calculation of at least one of a performance and number of matches based on a file type of the input data. In an example embodiment, the KPI may correspond to or indicate a metric for finalizing the best suitable regex for an application. The performance may correspond to average processing time for generated test cases. The key performance indicators may also include the number of matches for a particular optimized regex with respect to the test cases that may be executed. In an example embodiment, an input for the stimulation may include the optimized regex and test cases generated. The KPI may be calculated by running the optimized regex on a document pertaining to each test case to evaluate the processing time and number of matches. A resultant average number of matches from the regex across all test cases may be noted as the number of matches and a resultant average time required for processing may be noted as the performance. Based on the stimulation results, the endorsed result may be evaluated. The system facilitates automated integration of the endorsed result within an application module pertaining to the programming language. The automated integration may be performed through an integration device 190 coupled with the processor. The integration device may be a hardware or a suitable combination of hardware and software. At 188 of FIG. 1B, an application authorize integration using pre-stored credential. At 192, the optimized regex from the regex optimizer 112 may be integrated with the application module.

Figure 5A:
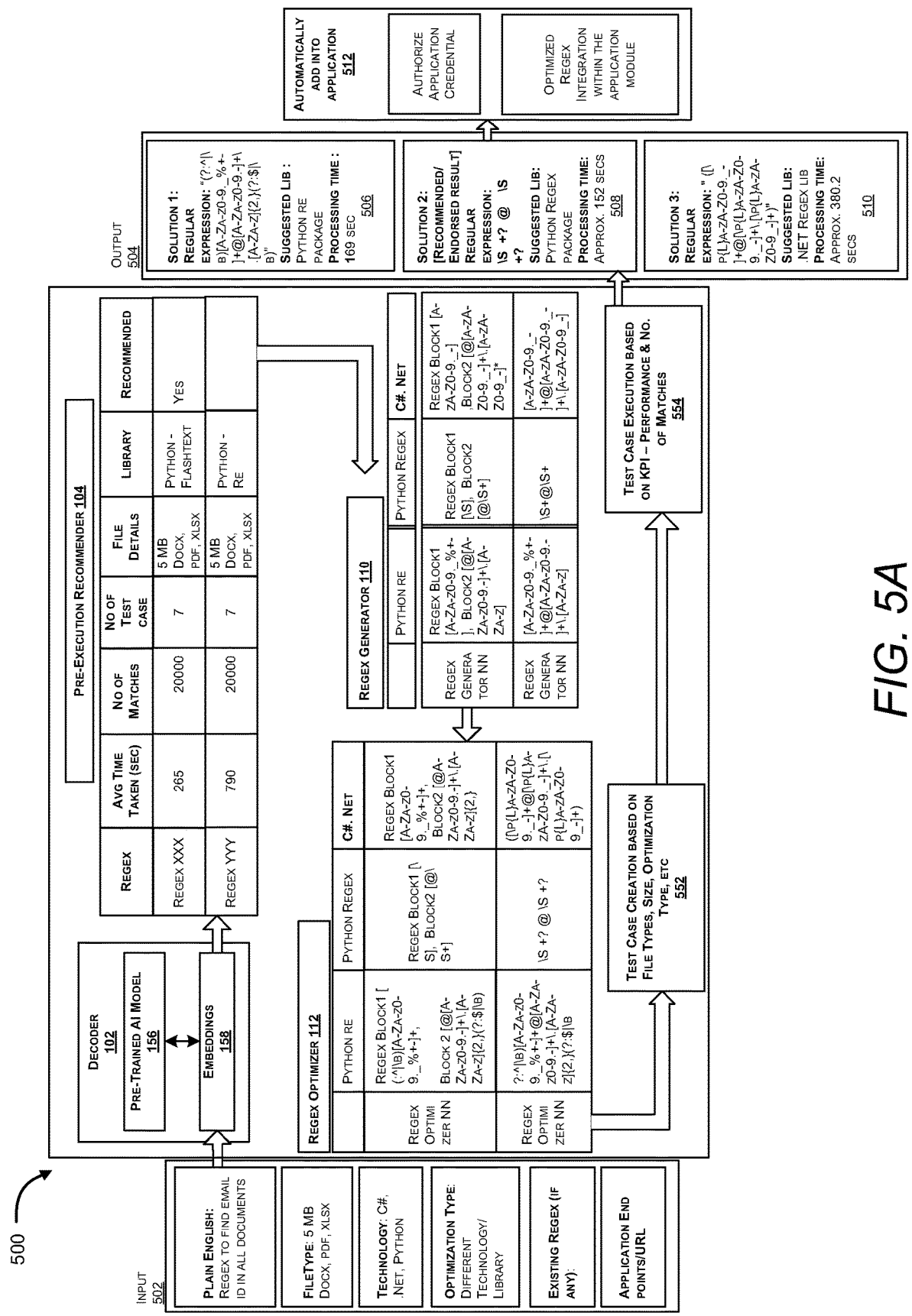
FIG. 5A illustrates a flow diagram for optimization of a newly generated regex, according to an example embodiment of the present disclosure.
Figure 6A:
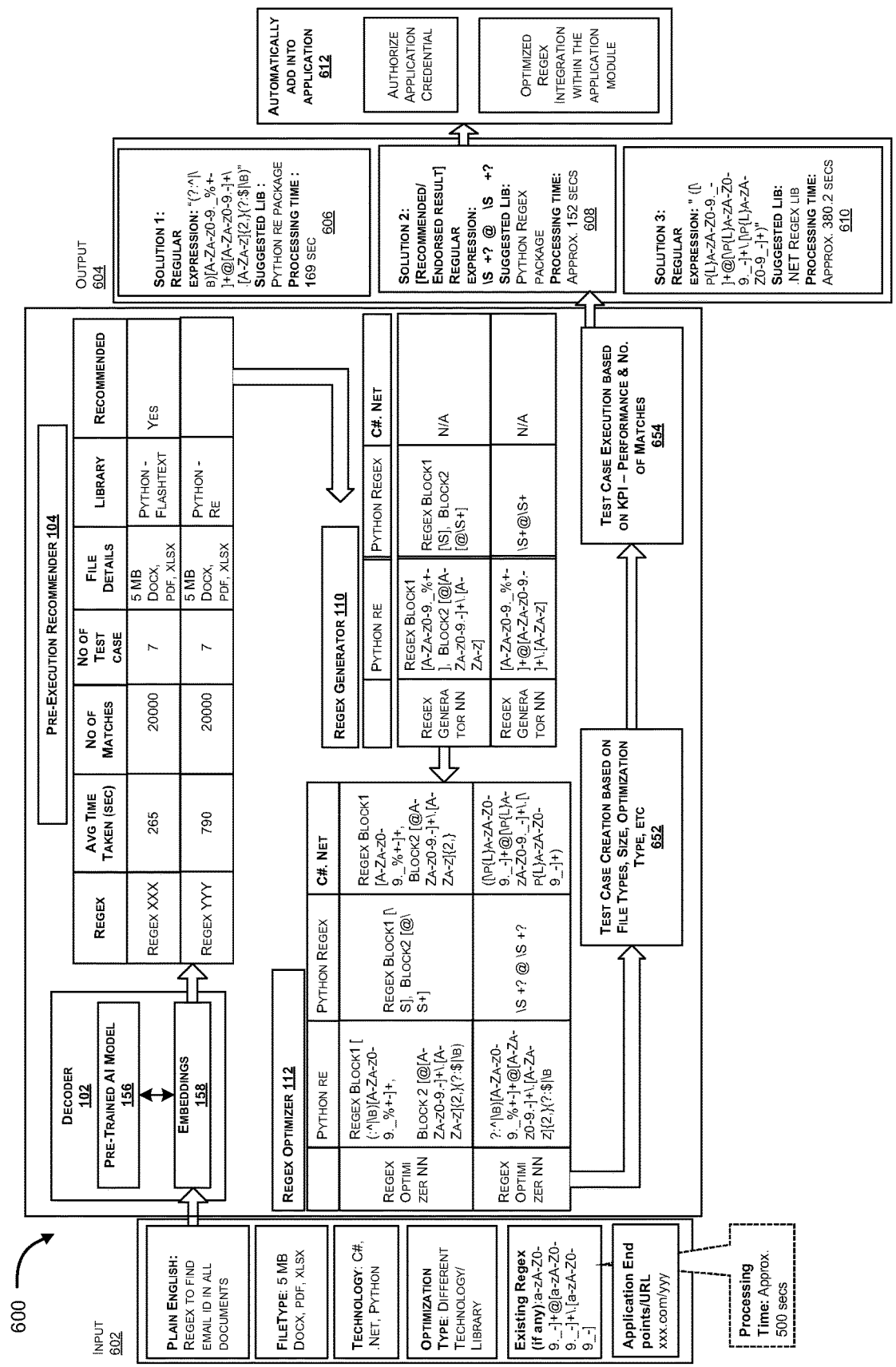
FIG. 6A illustrates a flow diagram for optimization of an existing regex, according to an example embodiment of the present disclosure.

Examples pertaining to an overall process are illustrated in FIGS. 5A and 6A. FIG. 5A illustrates a flow diagram for optimization of a newly generated regular expression, according to an example embodiment of the present disclosure. An input data 502 is provided to the decoder 102 for conversion to the plurality of embeddings 158 using the pre-trained AI model 156, as explained in the previous embodiments. The pre-execution recommender 104 generates an automated recommendation. For example, the pre-execution recommender 104 may generate multiple test cases to assess one or more attributes such as time taken for computation. Based on the assessment, the most suitable existing regex may be recommended. In an example embodiment, based on the recommendation by the pre-execution recommender 104, the AI engine 108 indicates a need for a newly generated regex. The flow diagram 600 further shows regex generation by regex generator 110 followed by optimization of the generated regex by the regex optimizer 112. The simulator performs simulation by generating test cases at 552 and execution of the test cases at 554. FIG. 5B illustrates blocks 552 and 554 of FIG. 5A, according to an example embodiment of the present disclosure. Based on the simulation, an output 504 including filtered results (506, 508, 510) may be obtained. The filtered result may include an endorsed result (shown as solution 2) (508) including minimum processing time (152 seconds). The endorsed result 508 may be used for further integration.

FIG. 6A illustrates a flow diagram for optimization of an existing regular expression, according to an example embodiment of the present disclosure. An input data 602 is provided to the decoder 102 for conversion to the plurality of embeddings 158 using the pre-trained AI model 156, as explained in the previous embodiments. The pre-execution recommender 104 generates an automated recommendation. In the present example, based on the recommendation, the AI engine 108 indicates suitability of an existing regex for further optimization at regex optimizer 112. In an example embodiment, if an optimization may be within same technology (or programming language) and/or library, the regex generator may not be needed and direct optimization may be facilitated. In another example embodiment, the optimization may be any one of, for example, within same technology (programming language) but with different libraries or within different technologies (programming languages) and different libraries. In this case, regex may be generated newly for those technologies/libraries that may not have an existing regex, such as, for example, regex is generated for Python and not for C#.NET as shown in FIG. 6A (table provided below numeral 110 in FIG. 6A). Post-optimization, simulator performs simulation by generating test cases at 652 and execution of the test cases at 654. FIG. 6B illustrates blocks 652 and 654 of FIG. 6A, according to an example embodiment of the present disclosure. Based on the simulation, an output 604 including filtered results (606, 608, 610) may be obtained. The filtered result may include an endorsed result (shown as solution 2) (608) including minimum processing time (152 seconds). The endorsed result 608 may be used for further integration with an application.

Figure 7:
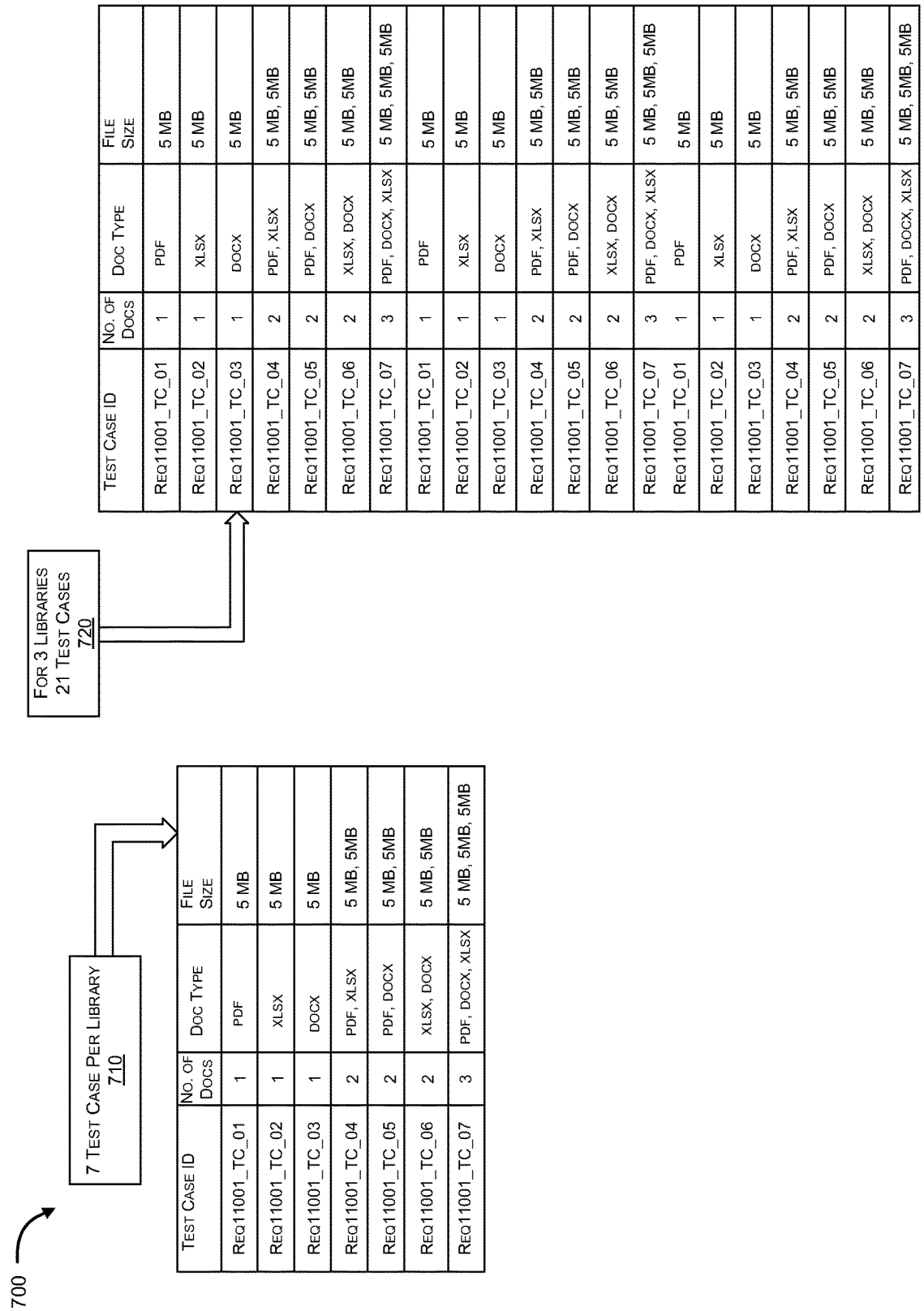
FIG. 7 illustrates examples of test case generation by a simulator of FIG. 1A, according to an example embodiment of the present disclosure.

As illustrated in FIGS. 5B and 6B, the simulation includes generation of a plurality of test cases. The test cases may be generated based on at least one of a file type, a file size, a library, a type of the programming language, a library, and an optimization type corresponding to the input data. The test cases are executed using the AI engine 108. The execution may include evaluating a processing time for each execution. Based on the minimum average processing time for a set of test cases, the endorsed result is obtained. The simulation further includes execution of the test cases based on the optimized regular expression received from the Regex optimizer. FIG. 7 illustrates an example 700 of test case generation by a simulator of FIG. 1A, according to an example embodiment of the present disclosure. As illustrated, the test cases may be generated for all possible combination of file types. For example, if the input data includes 3 file types (pdf, xlsx and docx), there may be 3 possible libraries and 7 possible combination of cases generated (as shown in 710). This leads to a total combination of 21 test cases (3 libraries×7 combinations). These 21 test cases may be executed using the optimized regex to evaluate the endorsed result including minimum processing time.

Figure 8:
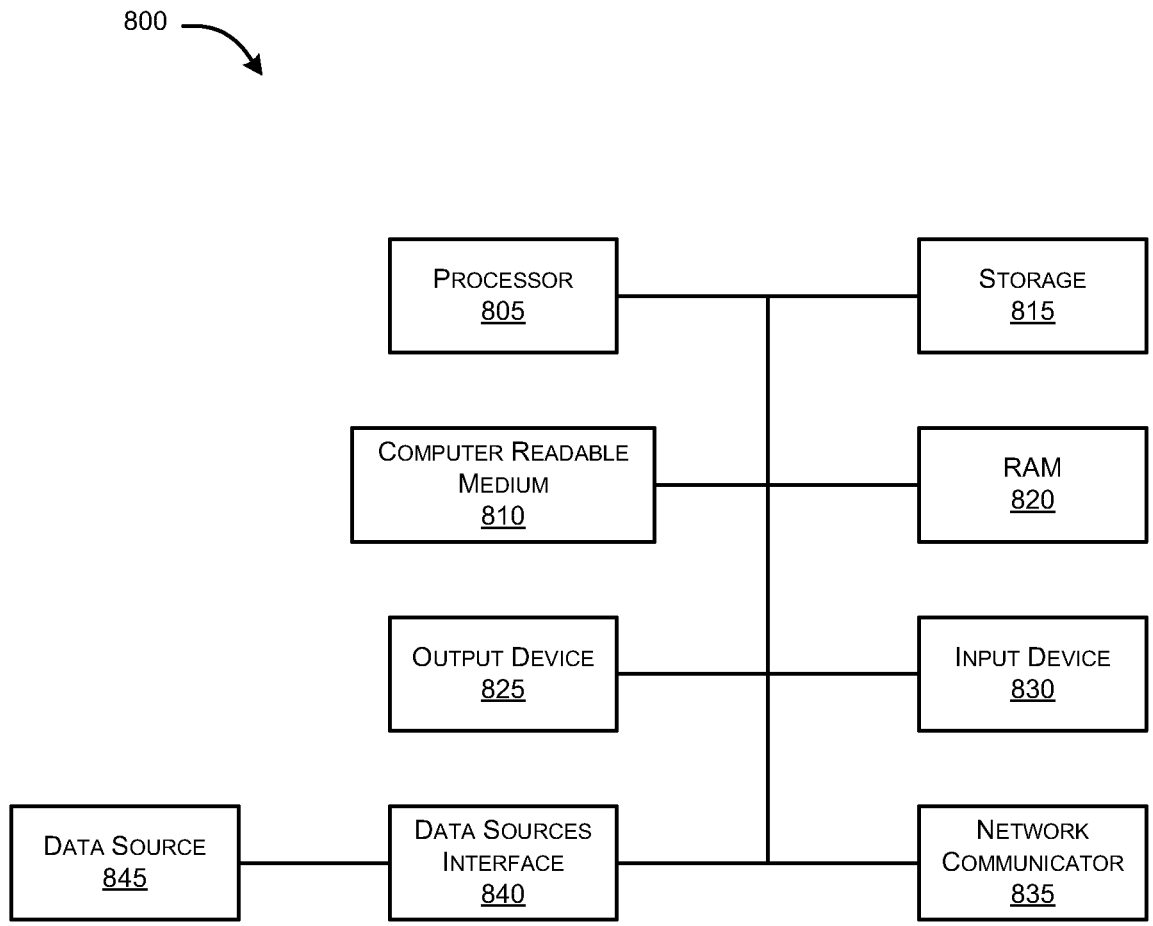
FIG. 8 illustrates a hardware platform for implementation of the disclosed system, according to an example embodiment of the present disclosure.

FIG. 8 illustrates a hardware platform 800 for the implementation of the system 100 of FIG. 1, according to an example embodiment of the present disclosure. For the sake of brevity, construction and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 800. As illustrated, the hardware platform 800 may include additional components not shown, and that some of the components described may be removed and/or modified. For example, a computer system with multiple GPUs may be located on external-cloud platforms including Amazon Web Services, or internal corporate cloud computing clusters, or organizational computing resources, etc.

The hardware platform 800 may be a computer system such as the system 100 that may be used with the embodiments described herein. The computer system may represent a computational platform that includes components that may be in a server or another computer system. The computer system may execute, by the processor 805 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 805 that executes software instructions or code stored on a non-transitory computer-readable storage medium 810 to perform methods of the present disclosure. The software code includes, for example, instructions to gather data and documents and analyze documents. In an example, the decoder 102 and simulator 116 may be software codes or components performing these steps.

The instructions on the computer-readable storage medium 810 are read and stored the instructions in storage 815 or in random access memory (RAM). The storage 815 may provide a space for keeping static data where at least some instructions could be stored for later execution. The stored instructions may be further compiled to generate other representations of the instructions and dynamically stored in the RAM such as RAM 820. The processor 805 may read instructions from the RAM 820 and perform actions as instructed.

The computer system may further include the output device 825 to provide at least some of the results of the execution as output including, but not limited to, visual information to users, such as external agents. The output device 825 may include a display on computing devices and virtual reality glasses. For example, the display may be a mobile phone screen or a laptop screen. GUIs and/or text may be presented as an output on the display screen. The computer system may further include an input device 830 to provide a user or another device with mechanisms for entering data and/or otherwise interact with the computer system. The input device 830 may include, for example, a keyboard, a keypad, a mouse, or a touchscreen. Each of these output device 825 and input device 830 may be joined by one or more additional peripherals. For example, the output device 825 may be used to display the results of the optimized regex or integration information.

A network communicator 835 may be provided to connect the computer system to a network and in turn to other devices connected to the network including other clients, servers, data stores, and interfaces, for instance. A network communicator 835 may include, for example, a network adapter such as a LAN adapter or a wireless adapter. The computer system may include a data sources interface 840 to access the data source 845. The data source 845 may be an information resource. As an example, a database of exceptions and rules may be provided as the data source 845. Moreover, knowledge repositories and curated data may be other examples of the data source 845.

Figure 9:
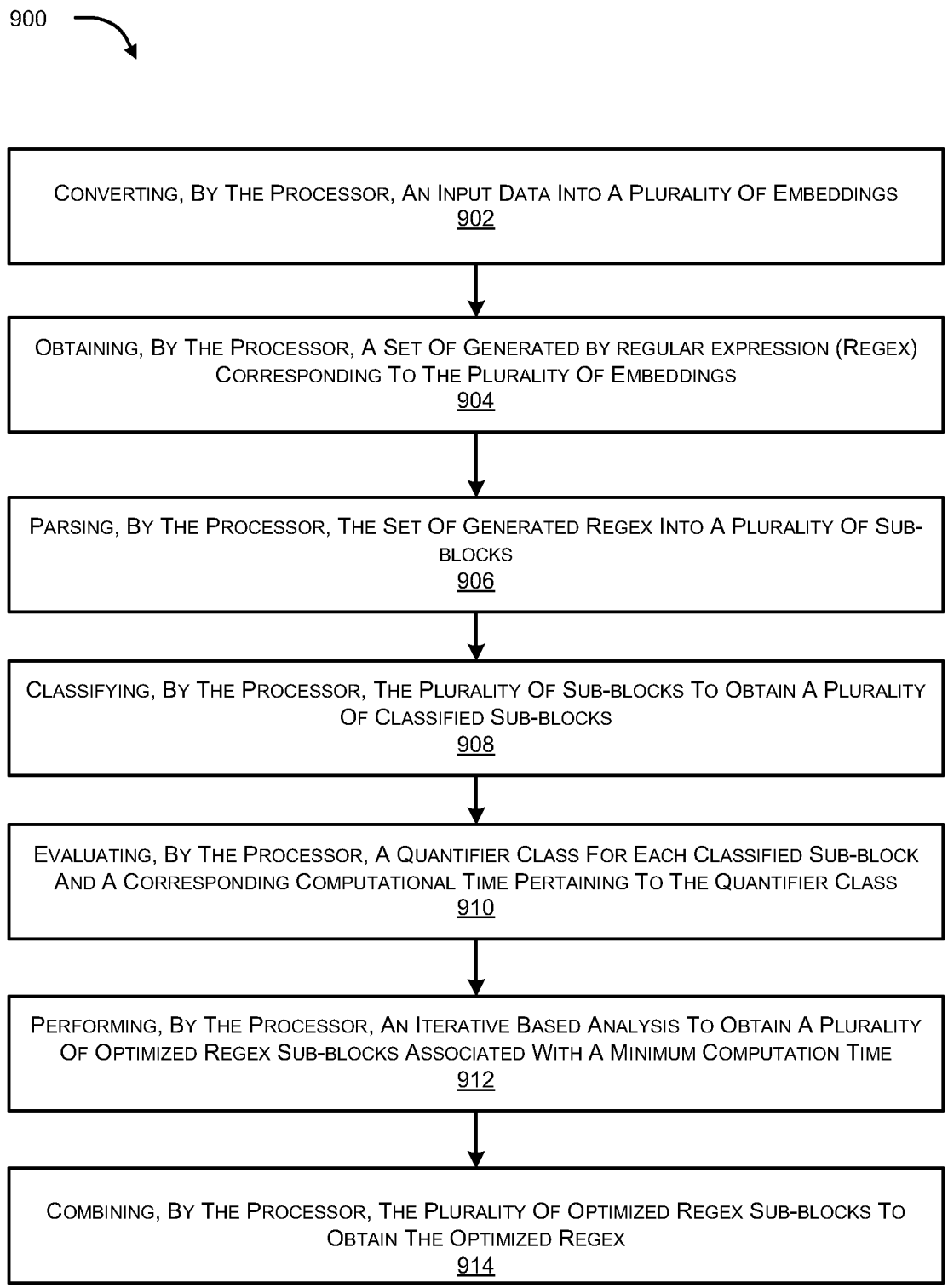
FIG. 9 illustrates a flow diagram for method steps for obtaining optimized regex, according to an example embodiment of the present disclosure.

FIG. 9 illustrates a process flowchart illustrating a method 900 for obtaining optimized regular expression, according to an example embodiment of the present disclosure. The order in which method 900 is described is not intended to be construed as a limitation, and any number of the described method blocks may be combined or otherwise performed in any order to implement method 900, or an alternate method. Additionally, individual blocks may be deleted from method 900 without departing from the spirit and scope of the present disclosure described herein. Furthermore, method 900 may be implemented in any suitable hardware, software, firmware, or a combination thereof, that exists in the related art or that is later developed. The method 900 describes, without limitation, the implementation of the system 100. A person of skill in the art will understand that method 900 may be modified appropriately for implementation in various manners without departing from the scope and spirit of the disclosure.

The method 900 may include the step 902 of converting an input data into a plurality of embeddings. At step 904, the method may further include the step of receiving a generated regular expression corresponding to the plurality of embeddings. The generated regular expression may be at least one of an existing regular expression and a newly generated regular expression. At step 906, the method may further include parsing the generated regular expression into a plurality of sub-blocks. At step 908, the method may further include classifying the plurality of sub-blocks to obtain a plurality of classified sub-blocks. At step 910, the method may further include evaluating a quantifier class for each classified sub-block to identify a corresponding computationally expensive class. At step 912, the method may further include performing an iterative analysis to obtain a plurality of optimized sub-blocks associated with a minimum computation time. The iterative analysis includes replacing the quantifier class with a substitute class and performing iterative computation cycles to evaluate the corresponding computation time with respect to the substitute class. At step 912, the method may further include combining the plurality of optimized sub-blocks to obtain the optimized regular expression.

The method may further include a step of performing simulation, by the processor, based on the optimized regular expression, to generate an output. The output may be in the form of filtered results comprising an endorsed result. The endorsed result may correspond to a least value of corresponding processing time. The method may further include a step of automatically integrating, by the processor, the endorsed result within an application module pertaining to the programming language.

The method may further include a step of generating, using the plurality of embeddings, an automated recommendation pertaining to a requirement for generating the optimized regular expression. The automated recommendation pertains to a recommendation of the existing regex in the database. Based on the recommended existing regex, the AI engine provides at least one of a negative recommendation to perform the automated generation of the optimized regular expression and a positive recommendation to utilize the existing regular expression.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   a decoder is configured to:
   receive an input data corresponding to a programming language;
   obtain a plurality of embeddings using Embeddings from Language Models (ELMO) which facilitates computing word vectors on top of a two-layered bidirectional language model (biLM) which includes forward pass and backward pass;
   convert the input data into the plurality of embeddings, wherein each embedding corresponds to a vector based representation of an attribute corresponding to the input data;

a processor including an artificial intelligence (AI) engine to generate an optimized regular expression (Regex) based on at least one of the type of the programming language and a corresponding library in the database, wherein the AI engine comprises a learning model associated with the AI engine for reinforced learning, wherein the learning model of the AI engine is automatically updated based on an information of the corresponding library in the database, the processor comprising:
   a Regex optimizer to:
   receive a generated regular expression corresponding to the plurality of embeddings, wherein the generated regular expression is at least one of an existing regular expression from a database and a newly generated regular expression from a Regex generator associated with the processor;
   parse the generated regular expression into a plurality of sub-blocks;
   classify, using a neural network based classifier associated with the AI engine, the plurality of sub-blocks to obtain a plurality of classified sub-blocks;
   evaluate, using the neural network based classifier, a quantifier class for each classified sub-block to identify a corresponding computationally expensive class, wherein the neural network based classifier includes an input layer, multiple hidden layers and an output layer;
   perform, using at least two reinforcement learning based deep neural network associated with the AI engine, an iterative analysis based on actor-critic algorithm to obtain a plurality of optimized sub-blocks associated with a minimum computation time, wherein one of the at least two reinforcement learning pertains to an actor and the another reinforcement learning pertains to a critic for executing the actor-critic algorithm, wherein the iterative analysis comprises replacing the quantifier class with a substitute class and performing iterative computation cycles based on an updated learning model for evaluating the corresponding computation time with respect to the substitute class by using a replace function corresponding to the programming language, wherein evaluating the corresponding computation time comprises:
   verifying if computation loops of the iterative computation cycles corresponding to the substitute class exceed a pre-defined threshold; and
   discarding the computation loops and identifying a new substitute class that requires minimum time or has minimum computation loops if the computation time for the substitute class exceeds the pre-defined threshold; and
   combine the plurality of optimized sub-blocks to obtain the optimized regular expression.

2. The system as claimed in claim 1, wherein the system comprises a simulator coupled to the processor, the simulator to:
   perform simulation to generate, based on the optimized regular expression, an output in the form of filtered results comprising an endorsed result corresponding to at least value of corresponding processing time, wherein the system facilitates automated integration of the endorsed result within an application module pertaining to the programming language.

3. The system as claimed in claim 2, wherein the simulation comprises generation of a plurality of test cases and execution of the test cases based on the optimized regular expression received from the Regex optimizer wherein the simulation includes key performance indicators (KPI) of the optimized regular expression including calculation of at least one of a performance and number of matches based on a file type of the input data.

4. The system as claimed in claim 3, wherein the simulator generates the plurality of test cases based on at least one of a file type, a file size, a type of the programming language, and an optimization type corresponding to the input data, and wherein the plurality of test cases are executed, using the AI engine, based on the optimized regular expression, to obtain the output, wherein the system facilitates evaluating the processing time for each execution based on which the endorsed result is selected.

5. The system as claimed in claim 1, wherein the system comprises the (Regex) generator to generate the newly generated regular expression using the AI engine.

6. The system as claimed in claim 1, wherein the Regex generator comprises a transformer architecture including a trained model utilizing a softmax function to generate the generated regular expression in the programming language.

7. The system as claimed in claim 1, wherein the system comprises a pre-execution recommender coupled to the decoder and the processor, the pre-execution recommender to:
generate, using the plurality of embeddings, an automated recommendation pertaining to a requirement for generating the optimized regular expression, wherein the automated recommendation pertains to a recommendation of the existing regex in the database, wherein based on the recommended existing regex, the AI engine provides at least one of a negative recommendation to perform the automated generation of the optimized regular expression and a positive recommendation to utilize the existing regular expression.

8. The system as claimed in claim 7, wherein the automated recommendation is based on verification of one or more parameters of the plurality of embeddings with pre-stored parameters in the database.

9. The system as claimed in claim 1, wherein the input data corresponds to at least one of a plain language text, a file type, a file size, a type of the programming language, an existing regular expression, and an application content, wherein the application content includes a uniform resource locator, and wherein the plain language text is English language text.

10. The system as claimed in claim 1, wherein the decoder executes a pre-trained artificial intelligence model to obtain the plurality of embeddings.

11. The system as claimed in claim 1, wherein the Regex optimizer parses the generated regex by using a split function corresponding to the programming language, and wherein the Regex optimizer replaces the quantifier class with the substitute class by using a replace function corresponding to the programming language.

12. The system as claimed in claim 1, wherein the optimization is performed by an optimizer algorithm associated with the Regex optimizer, wherein the iterative analysis is performed using reinforcement learning embedded within the reinforcement learning based deep neural network, and wherein the reinforced learning comprises the learning model associated with the AI engine.

13. The system as claimed in claim 12, wherein information pertaining to the optimized regular expression is stored in the database such that based on the stored information, the learning model of the AI engine is automatically updated, and wherein based on the updated learning model, the Regex optimizer automatically prioritizes and selects a suitable library for each sub-block during the iterative computation cycles, such that number of required iterative computation cycles reduces by using the updated learning model.

14. The system as claimed in claim 1, wherein the corresponding computation time in the iterative analysis is evaluated to verify if computation loops of the iterative computation cycles corresponding to the substitute class exceeds the pre-defined threshold, wherein the computation loops are discarded upon exceeding the pre-defined threshold and the new substitute class is evaluated to identify the substitute class that requires minimum time for the corresponding computation loops to obtain the optimized sub-blocks including minimum computation loops, the computation loops are discarded based on penalization of the computation loops by a reinforcement logic associated with the reinforcement learning based deep neural network.

15. The system as claimed in claim 1, wherein the reinforcement learning based deep neural network is trained with multiple libraries corresponding to the programming language, and wherein the reinforcement learning based deep neural network comprises plurality of hidden layers including optimizer and loss function corresponding to a sparse categorical cross entropy function.

16. The system as claimed in claim 15, wherein the database is a knowledge database comprising the multiple libraries corresponding to the programming language, and wherein the database comprises optimization-based data and execution-based data corresponding to pre-stored regular expression.

17. A method for obtaining optimized regular expression, the method comprising:
receiving, by a processor, an input data corresponding to a programming language;
obtaining, by the processor, a plurality of embeddings using Embeddings from Language Models (ELMO) which facilitates computing word vectors on top of a two-layered bidirectional language model (biLM) which includes forward pass and backward pass;
converting, by the processor, the input data into the plurality of embeddings, wherein each embedding corresponds to a vector based representation of an attribute corresponding to the input data;
generating, by an Artificial Intelligence (AI) engine associated with the processor, an optimized regular expression (Regex) based on at least one of the type of the programming language and a corresponding library in the database, wherein the AI engine comprises a learning model associated with the AI engine for reinforced learning, wherein the learning model of the AI engine is automatically updated based on an information of the corresponding library in the database, wherein generating the optimized regular expression comprises:
receiving, by the processor, the generated regular expression, from the Artificial Intelligence (AI) engine, corresponding to the plurality of embeddings, wherein the generated regular expression is at least one of an existing regular expression from a database and a newly generated regular expression;
parsing, by the processor, the generated regular expression into a plurality of sub-blocks;
classifying, by the processor associated with a neural network-based classifier, the plurality of sub-blocks to obtain a plurality of classified sub-blocks;

evaluating, by the processor, a quantifier class for each classified sub-block to identify a corresponding computationally expensive class;

performing, by the processor executing using at least a two reinforcement learning based deep neural network associated with the AI engine, an iterative analysis based on an actor-critic algorithm to obtain a plurality of optimized sub-blocks associated with a minimum computation time, wherein one of the at least two reinforcement learning pertains to an actor and the another reinforcement learning pertains to a critic for executing the actor-critic algorithm, wherein the iterative analysis comprises replacing the quantifier class with a substitute class and performing iterative computation cycles based on an updated learning model for evaluating the corresponding computation time with respect to the substitute class by using a replace function corresponding to the programming language, wherein evaluating the corresponding computation time comprises:

verifying if computation loops of the iterative computation cycles corresponding to the substitute class exceed a pre-defined threshold;

discarding the computation loops and identifying a new substitute class that requires minimum time or has minimum computation loops if the computation time for the substitute class exceeds the pre-defined threshold; and combining, by the processor, the plurality of optimized sub-blocks to obtain the optimized regular expression.

18. The method as claimed in claim 17, wherein the method comprises: generating, using the plurality of embeddings, an automated recommendation pertaining to a requirement for generating the optimized regular expression, wherein the automated recommendation pertains to a recommendation of the existing regex in the database, wherein based on the recommended existing regex, the AI engine provides at least one of a negative recommendation to perform the automated generation of the optimized regular expression and a positive recommendation to utilize the existing regular expression.

19. The method as claimed in claim 18, wherein the method comprises:

performing simulation, by the processor, based on the optimized regular expression, to generate an output in the form of filtered results comprising an endorsed result corresponding to a least value of corresponding processing time; and integrating automatically, by the processor, the endorsed result within an application module pertaining to the programming language.

* * * * *